United States Patent [19]

Mitchell et al.

[11] 4,258,891
[45] Mar. 31, 1981

[54] COVER AND STAND FOR BAGS

[76] Inventors: James G. Mitchell; Winalee G. Mitchell, both of Pine Lake Industrial Park, Dunbridge, Ohio 43414

[21] Appl. No.: 945,962

[22] Filed: Sep. 26, 1978

[51] Int. Cl.³ .............................................. A63B 55/08
[52] U.S. Cl. ...................................... 248/98; 248/150
[58] Field of Search ............... 248/98, 97, 129, 150; 280/659; 150/49; 232/43.2; 220/252

[56] References Cited

U.S. PATENT DOCUMENTS

| | | | |
|---|---|---|---|
| 399,753 | 3/1889 | Jones | 220/252 |
| 540,807 | 6/1895 | Andrews | 220/252 |
| 697,655 | 4/1902 | O'Leary | 220/252 |
| 968,828 | 8/1910 | Beckley | 220/252 X |
| 1,080,478 | 12/1913 | Reis | 220/252 X |
| 1,631,498 | 6/1927 | Melniker et al. | 150/49 UX |
| 2,250,729 | 7/1941 | Smith et al. | 220/252 |
| 2,312,907 | 3/1943 | Huenlich | 220/252 X |
| 3,379,367 | 4/1968 | Murcott | 232/43.2 |
| 3,556,395 | 1/1971 | Herman | 232/43.2 |
| 3,633,932 | 1/1972 | Holden | 150/49 X |
| 3,870,261 | 3/1975 | McSwain | 248/101 |
| 3,893,648 | 7/1975 | Gilbert | 248/97 |
| 3,992,038 | 11/1976 | Guadano | 280/659 |
| 4,040,644 | 8/1977 | Flagg | 248/98 X |

Primary Examiner—J. Franklin Foss
Attorney, Agent, or Firm—Pollock, Vande Sande & Priddy

[57] ABSTRACT

A cover for a laundry bag supported between pivotally interconnected leg members of inverted U-shape. The cover comprises a hood having slots near the ends of its opposing side walls, for fitting over pivot members extending between the two leg members and pivoting thereon from an open position in which the mouth of the bag is exposed to a closed position in which it is completely covered. The cover may be hand operated or spring closed and foot opened.

13 Claims, 7 Drawing Figures

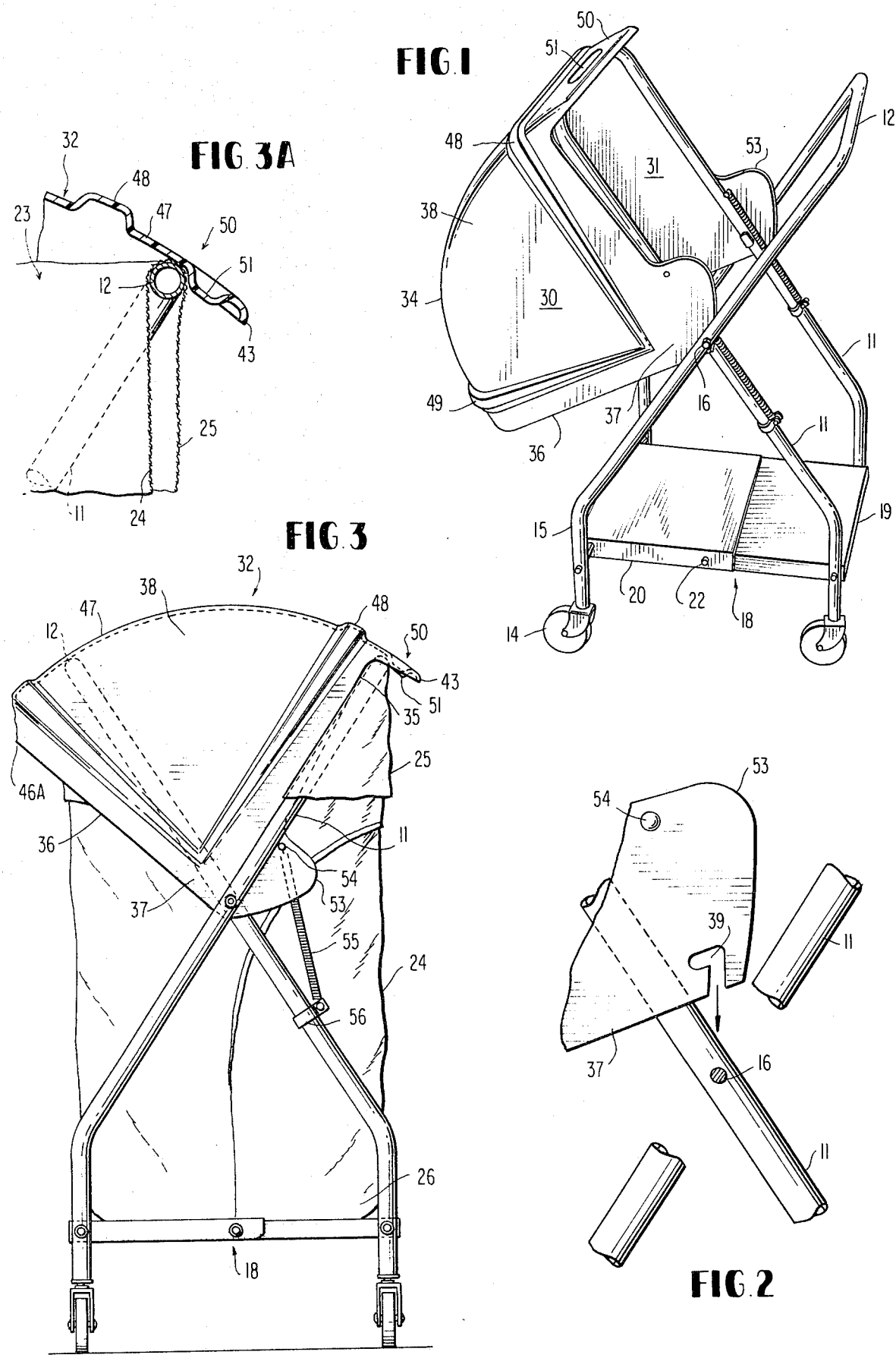

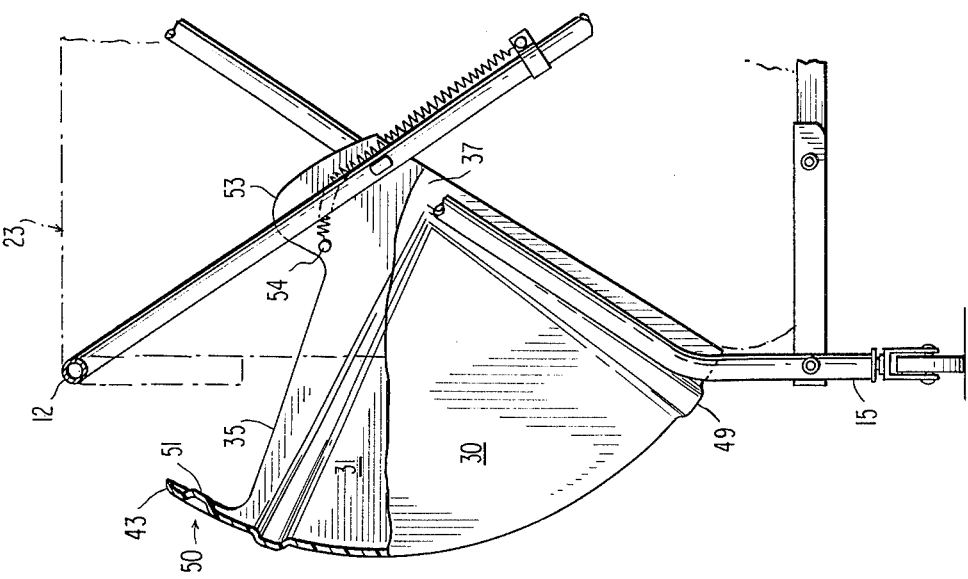
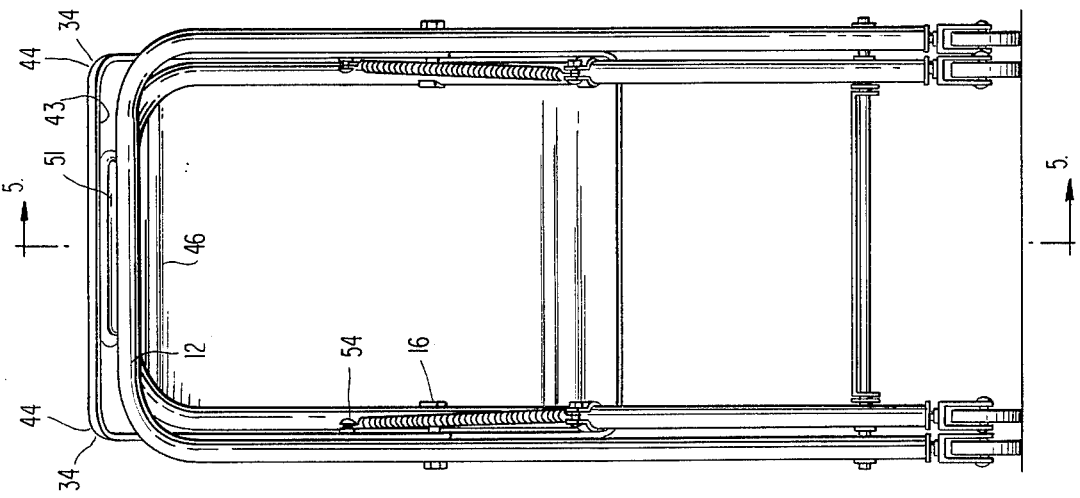
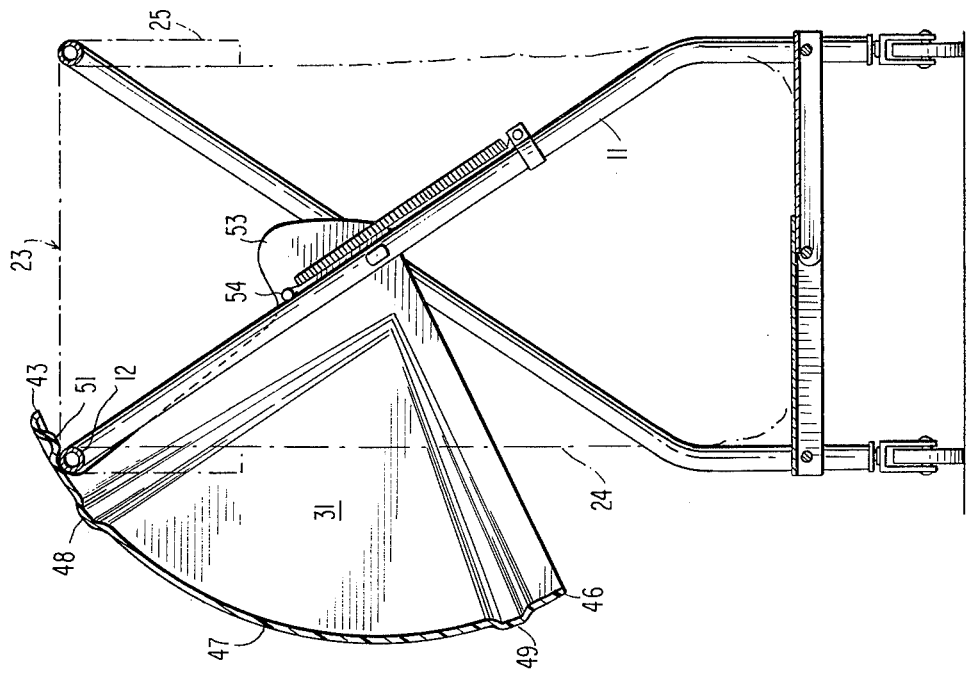

COVER AND STAND FOR BAGS

BACKGROUND

Efficient collection and handling of soiled and contaminated linen and other laundry has been a continuing challenge to hospitals. The challenge applies to all phases of laundry handling, including its removal from the patient environment.

Prior to the present invention, a common—and perhaps the most common—technique for removing soiled and contaminated launderable material from patient care areas involved rolling hamper stands. Such stands, widely believed to represent the most convenient and cost-effective collection arrangement, typically comprise casters supporting a scissors type frame with a pair of pivotally interconnected inverted U-shaped frame members with laundry bag supporting means, such as a platform, secured adjacent the base of the frame. A laundry bag is removably attached at the top of the frame and hangs down between the frame members with the bottom of the bag resting on the platform or other supporting means.

In the past such hamper stands were wheeled from room to room, with the bag supported in an open-mouth condition. At each stop various kinds and amounts of soiled objects were dropped through the open bag mouth. After a number of stops, when the bag was full, it would be closed and sent on its way to the laundry by a number of alternative means, including carts, chutes, pneumatic transmission tubes and so forth.

Observers have recognized a need for closure of laundry bags. Examples may be found for instance in U.S. Pat. Nos. 3,379,367; 3,633,932 and 3,893,648. More recently, the Joint Commission on Accreditation of Hospitals amended its Accreditation Manual for Hospitals to require that soiled linen must be collected in impervious bags or containers that are properly closed at the site of collection. An official of the Commission has been quoted as interpreting the above requirement to mean that "properly closed" refers to a closing procedure that minimizes the discharge of contaminated air from within the bag into the patients' environment. The "site of collection" was said to mean at the bedside of the patient.

Faced with the problem of conforming to the new requirements, hospital operators proposed various solutions. These included among others: detaching the top of the bag from the top of the stand, closing it at the bedside in each room and then re-opening and re-adjusting it on the stand upon entering the next room; replacing conventional hamper stands with a "step-on" lid opening hamper; use of a "shower cap" type of cover made of fabric to put over the top of the hamper; use of a handle-and-hanger equipped lid, free of attachment to the stand or bag, analagous to a garbage can lid; use of plastic film laundry bags with twist type closures; the "Sak-Rak" TM (Principle Business Enterprises, Inc., Dunbridge, Ohio) system; and a variety of other bag-closing and lid arrangements.

The present invention involves the discovery that the nuisance, inefficiency, expense and potential for contamination involved in some prior methods can be reduced or eliminated.

SUMMARY OF THE INVENTION

The present invention includes a bag cover, and the combinations of such cover with a bag or with a bag frame, such as for instance the pivotally connected inverted U-shaped frame of the type referred to above.

The cover is at least semi-rigid. This means that its material of construction as fabricated in the completed cover, may have some flexibility, but is self-supporting in its hereinafter defined shape and preferably can not be folded or collapsed upon itself without suffering breakage or permanent deformation.

The cover is unitary in the sense that its several component panels, to be described hereinafter, are fully integral with one another, i.e. they are all formed as a continuous single body of material. The said single body may for example be composed of synthetic resinous material, with or without internal fiber reinforcement, shaped by any convenient technique. Preferably, a flat sheet of polypropylene, polyethylene, vinyl or other resin may be thermoformed with the aid of vacuum to simultaneously form all panels of the cover from the same sheet. Alternatively, the several panels may be formed by lay-up or spray-up of liquid polyester resin and fiberglass cloth and/or mat and/or chopped fibers in a mold corresponding to the shape of the cover. The cover may also be formed by pressing, injection molding or other techniques.

The shape of the cover may be conceptualized as having its unitary structure comprised of three portions or panels of fixed shape. These include two generally vertical side panels connected and held in generally parallel relationship by a top panel which may be divided into several sub-panels.

The side panels, which may be of various shapes, preferably include an upper edge and leading and trailing edges which respectively lead and trail in the closing movement of the cover. The side panels preferably taper, as viewed in side elevation, from a relatively narrow width at the bottom to a relatively wider width at the top. This does not however exclude the possibility of having some portion of the side panel, intermediate the top and bottom, which is not as wide as the bottom.

The two side panels respectively include at their bottoms two pivots, which may be simple holes, slots, stub shafts or any other form of pivots, by which the cover may be attached to a stand for rotation thereon.

The upper panel includes front side and rear edges. These surround and define the perimeter of an intervening surface or surfaces spaced above a horizontal axis of rotation defined by the above-mentioned pivots. In general, the upper panel, considered as a whole, and viewed in side elevation is at or above an arc defined by rotation of the front edge about the aforementioned axis. Thus, the upper panel of the cover, whether in the form of several contiguous sub-panels of flat or other configuration, or in the form of one arcuate panel, which is preferred, is generally at or above the above-mentioned arc. Preferably the upper panel corresponds to said arc.

The references to "edges" in the aforementioned paragraphs do not necessarily imply sharp lines of demarcation. Thus, for example, it is preferred that the side edges of the upper panel blend smoothly into the upper edges of the side panels, whereby the connection between the side and upper panels appears as a smooth curve when viewed in a cross-section taken in a plane perpendicular to the side panels.

The cover may be provided with closing means, including a projection of at least one and preferably of both side panels. For example such closing means may be and preferably is at least partly included in the unitary structure of the cover, being in the form of forward projections of the leading edges of the bottoms of the side panels. As applied to such projections, forward indicates extension of a side panel leading edge in the general direction which such edge moves during closing of the cover. By extending forwardly of the leading edges adjacent the aforementioned pivots, the projections serve as levers to which may be attached any suitable tension means which is placed under tension by opening of the cover, thus exerting a closing force thereon.

The above-described cover is useful with a wide variety of stands adapted to support a bag in open-mouthed upright position. Such stands generally include generally upright frame members and one or more elevated support members for suspending the bag upright in open-mouthed condition. For purposes of the present invention, such stands should also include pivot attachments, positioned at a lower elevation than the bag mouth, to which the pivots on the cover side panels are pivotally secured. The pivot attachments are positioned for pivotal movement of the cover between a closed position in which the bag mouth is covered and an open position in which the bag mouth is uncovered and for causing the cover upper panel front and rear edges, respectively, to pass at or above, but closely adjacent to, the front and rear edges of the mouth of the bag, as the cover approaches closed position.

It is an advantageous option to form the upper panel such that its front edge projects forwardly of the leading edges of the side panels. Thus in a scissors frame type hamper stand, the front edge of the fully closed cover can overhang the upper front horizontal cross-member of the stand. When a depression is formed in such overhang it can engage such cross-member.

BRIEF DESCRIPTION OF THE DRAWINGS

FIG. 1 is a perspective view of the bag holder:

FIG. 2 is a perspective view of the leg members:

FIG. 3 is a perspective view of a side of the bag holder:

FIG. 3A is a sectional view of the latch means for the cover:

FIG. 4 is a perspective view of the bag holder:

FIG. 5 is a sectional view taken generally along lines 5—5 of FIG. 4;

FIG. 6 is a sectional view showing one side of the bag holder.

DESCRIPTION OF A PREFERRED EMBODIMENT

The following is but one example of a wide variety of "stands" or "frames" which may be used in the present invention. These terms connote any structure capable of supporting a bag in generally upright configuration with its mouth open upwardly. Thus, the frame members may comprise for instance an open tubular frame, which is preferred, or the panels of a cabinet arrangement having surrounding closed or semi-closed side panels and an opening at the top through which access may be gained to the bag mouth. The frame and cover may be formed of any material(s) conforming to the above criteria. The bag may also be of any suitable material, but cloth bags are most commonly used at present.

In the preferred embodiment of FIG. 1, the stand comprises two inverted U-shaped frame members. Slanted straight portions 11 represent the sides of each "U", while the base of each "U" is a generally horizontal portion 12, e.g. horizontal cross-member, which can support the mouth of a bag.

In general, the stand will include some kind of base or foot. In the preferred embodiment of FIG. 1, the base comprises a plurality of casters 14. To facilitate caster mounting, the frame members may include vertical portions 15.

The various frame portions are interconnected. Each frame member may be conveniently fabricated from a single continuous length of bent tubular metal stock.

Interconnection and pivotal movement of the U-shaped frame members is provided by bolts 16, pins, or other suitable connectors passing through holes in the slanted portions 11 intermediate the horizontal and base portions of the frame. See FIG. 2. Preferably, one U-shaped frame member is slightly smaller than the other, so its slanted portions 11 can fit between and closely adjacent the slanted portions of the other frame member. Short spacers (not shown) concentric with bolts 16, may be positioned between the frames where the latter are held together by the bolts, in order to provide clearance for the side panels of the cover described below. Bolts 16 are tightened snugly against the frame members but not so tight as to prevent pivotal movement of the latter.

Means are generally provided to limit downward pivotal movement of the frame members. Such means may be and preferably is combined with a platform 18 or other supporting means for the bottom of a bag. Optionally, the platform 18 may be of two sections 19 and 20, the former being adapted to telescope with a right to left horizontal motion into the latter, since the pins 22 which join these sections are capable of relative movement in horizontal slots (not shown) formed in one or both of the sections. Platform 18 shown fully extended in FIG. 1, is connected to the vertical portions 15 by any suitable means permitting pivotal movement between the platform and frame members, which are held as shown in their extreme downward position. Folding of the frame members upwardly and towards one another is accompanied by telescoping of platform portions 19 and 20.

In general, a portion of the stand secures the mouth of the bag thereto. In the present preferred embodiment, such is accomplished by the horizontal cross-members 12 (see FIGS. 3 and 3A) over which a portion of the material of the mouth 23 of a bag 24 may be draped in the form of an inverted cuff 25. The bag is therefore at least partly supported by suspension from the upper portion of the frame, and is held generally upright between the frame members. If the bag is of sufficient length, the bag may also be supported by having the bag bottom 26 rest on platform 18.

The several panels comprising the cover include side panels 30 and 31, and top panel 32. In the present embodiment, each side panel comprises upper (34), leading (35) and trailing (36) edges, and has bottom (37) and top (38) portions shown in FIGS. 1–3. Open-ended "J"-slots 39, shown in FIG. 2, formed in bottom portion 37 of each side panel 30 and 31, are adapted to slip onto bolts 16 between the "U"-shaped frame members. When the above-mentioned spacers are provided, the inner surfaces of slots 39 bear on the outer surfaces of the spacers and can rotate relative to the bolts, whereby the entire cover can pivot or rotate around an axis extending from one side panel to the other, through the slots. When the cover includes an open-ended pivot means, such as slots 39, removal of the cover from the stand for cleaning can be very easily accomplished.

Top panel 32 includes front (43), side (44) and rear (46, 46A) edges seen in FIGS. 1, 3, 3A and 4–6, which bound an upper arcuate surface 47. If desired, as shown in FIG. 3A and elsewhere, front edge 43 may be and preferably is turned downwardly from arcuate upper surface 47 along a substantial portion of its width, adding rigidity to the front of the cover. Side edges 44 correspond to upper edges 34 of the side panels (as seen in FIG. 4). Surface 47 generally corresponds to an arc defined by rotation of front edge 43 about the above-mentioned axis of rotation which extends through slots 39. Ribs 48 and 49 may be, preferably are formed in surface 47 and side panels 30 and 31 to add rigidity to the cover. Rib 49 also acts as a stop to prevent excessive rotation of the cover in the bag insertion and removal position shown in FIG. 6. While rear edge 46 may be at the elevation of the above-mentioned arc as shown in FIG. 5, it may also be at a different elevation, for instance a lower elevation as illustrated by 46 in FIG. 3, wherein it may prevent excessive rotation of the cover in the closing direction by striking rear horizontal cross-member 12.

The top panel may include a forward projection or visor 50. As best shown in FIG. 6, visor 50 extends forward of side panel leading edge 35. When the cover is in closed position as shown in FIGS. 3 and 3A, the visor overhangs the bag mouth and front cross-member 12, even though the clock-wise motion of leading edge 35 is stopped short of the cross-member 12 by the bag cuff 25 where the latter is draped over the cross-member and over the upper end of frame slant portion 11. It is advantageous to provide a depression 51 in top surface 47 near front edge 43, and especially in visor 50. Such a depression can perform one or more functions including serving as operating handle, closure lock and opening stop. When the distance from the bottom of depression 51 to bolts 16 is slightly shorter than the distance from the bolts to the top of cross-member 12, and the visor is capable of limited upward bending perpendicular to the above-mentioned axis of rotation, in an amount at least equal to the differences in said distances, the depression 51 will strike the cross-members 12 and interfere with rotation of the cover. Under these circumstances it can act as closure-lock and opening stop as shown in FIGS. 3A and 5, respectively. However, by manual deformation of visor 50 the depression can be caused to pass over either cross-member 12 to open the cover (FIG. 5) or to move the cover completely clear of the bag mouth (FIG. 6) to facilitate changing bags.

If desired, the stand and cover combination may be provided with any of a wide variety of closing means. A preferred example includes providing forward-projections 53 in leading edges 35 of cover side panels 30 and 31. In or on these projections may be provided or secured suitable attachment means, such as bolts 54, for tensioning means, such as springs 55, the other ends of which are secured to clamps 56 on frame slanted portions 11. It is beneficial to mount the springs so their upper ends are inside the projections 53, which then can at least partially shield the springs from contact with personnel, projections on furniture and the like, both when the cover is open or closed. If the bolts 54 are long enough to interfere with the slanted portions 11 of the inner U-shaped frame member on rotation of the cover, they can be positioned to strike the frame member when the cover is in its normal open position as shown in FIGS. 4 and 5. Thus, the bolts 54 can supplement the opening stop function of depression 51, by discouraging further opening of the cover. In such circumstances, the side panels 30 and 31 advantageously have some flexibility for bowing outward in the vicinity of the bolts 54. This makes it possible for the inner ends of bolts 54 to squeeze past the adjacent slanted portion 11 when the cover is forcibly rotated counter-clockwise, pushing the bolts against the frame, whereby the latter pushes the bolts outwardly, flexing the cover sides outwardly, so the bolts can slip past the frame. This enables the cover to rotate to the bag-changing position shown in FIG. 6.

When the tensioning means is elongated and arranged to exert downward force on the side panels it serves an added useful function. Assuming that the cover pivot means includes open-ended slots, such as slots 39, and that the open ends of the slots face downward in one or more of the operating positions of the cover, the tensioning means tends to maintain operating engagement between the slots and bolts 16, i.e. discourages the slots from slipping off the bolts.

An optional but particularly preferred feature is to provide a cover wherein said cover, as viewed in side elevation with its side panel leading edge appearing on the right, has the upper and lower portions of the leading edge displaced respectively to the left and right of a radius line drawn from the above-mentioned axis of rotation to the front edge of its top surface. This affords opportunity for the lower portions to project forwardly and act as levers as described above, while the left or rearward displacement of the upper portions simultaneously affords opportunity for the front edge of the top panel to overlap the front cross-member 12 and the front of the bag mouth, and to form a tight closure, even though the upper portion is blocked by the bag draped over the slanted portion 11 of the frame.

Thus, the present invention provides a simple, inexpensive hamper stand cover which permits opening and closing of a hamper stand with minimal air movement. The cover opens in such a way as to cause its upper panel to move in an arcuate fashion above the bag. This minimizes up and down movement of the cover relative to the bag mouth, reducing the tendency toward fanning of contaminated air out of the bag and into the patient environment. In a sense, the preferred form of the invention "cuts" through the air rather than fanning it. Moreover, the invention is capable of being embodied in various forms which may have one or more of the following added advantages. The cover may fit easily into place on a variety of conventional hamper stands now in use, and is just as easily removed for steam-cleaning, disinfecting, sterilizing or storage. The cover may stay open by itself during deposit and removal of soiled linen, and need not necessarily be taken off during replacement of bags on the hamper stand.

Persons skilled in the art will recognize that the invention as described in the above Summary of Invention can be embodied in a wide variety of forms differing from the above-described embodiment, which is given for purposes of illustration and not for the purpose of limiting the invention.

What is claimed is:

1. A cover member adapted for pivoting movement between open and closed positions on a device for holding and supporting a bag with the mouth of the bag opening upwardly, said device having two leg members of inverted U-shape connected by pivot members for pivoting movement relative to one another, said bag being located between said leg members, said cover member comprising
   (a) a substantially hood-shaped article having first and second side portions for extending beside the bag and below the mouth of the bag and a top portion connecting said side portions for extending over the mouth of the bag; and
   (b) means in each of said side portions for rotatably mounting said hood-shaped article on the pivot members connecting the leg members for movement between open and closed positions relative to the mouth of the bag.

2. A cover member according to claim 1, wherein each said side portion has a projecting portion which, when said cover member is mounted on the bag holding and supporting device, extends between adjacent portions of said leg members, said mounting means being disposed in each of said projecting portions.

3. A cover member according to claim 1, including a visor portion for projecting over the forward edge of a bag mounted on said device when said cover member is in its closed position.

4. A cover member according to claim 3, including a depression adjacent the leading edge of said visor portion for securing said cover member in its closed position by snap fit over the top connecting portion of the front one of the U-shaped leg members.

5. A cover member according to claim 1, wherein said mounting means comprises a slot in each of said side portions, said slot being sized to fit over the pivot members.

6. A cover member according to claim 1, wherein said top portion comprises an inwardly extending trailing edge means for cooperating with the rear one of the leg members to prevent excessive rotation of the cover member in the closing direction.

7. A cover member according to claim 3, including a depression adjacent the leading edge of said visor portion for securing said cover member in its open position by contacting the top connecting portion of the rear one of the U-shaped leg members.

8. A cover member according to claim 1, wherein said side portions include a leading edge in the closing direction, the upper portion of said leading edge terminating adjacent the front one of said leg members in the closed position and the lower portion of said leading edge extending beyond the front one of said leg members in the closed position, further comprising spring means for attachment between the bag holding device and said lower portions, for biasing the cover member toward its closed position.

9. A cover member according to claim 1, wherein said side portions include a trailing edge in the closing direction, and rib means located near said trailing edge for cooperating with the leg members to prevent excessive rotation of the cover member in the opening direction.

10. A closure for pivoting movement between open and closed positions on a device for holding and supporting a bag with the mouth of the bag opening upwardly, said closure comprising:
   (a) a cover element having first and second side portions for extending downwardly beside the bag and below the mouth of the bag, a top portion connecting said side portions for extending over the mouth of the bag, a visor portion for projecting over the forward edge of a bag mounted on the bag holding and supporting device, when the cover element is in its closed position; and
   (b) means located on said side portions below the mouth of the bag for rotatably mounting said cover element on the device for holding and supporting a bag so that the bag mouth is open in the open position of said cover element and is closed by said side portions and said top portion in the closed position of said cover element.

11. A closure according to claim 10, including a depression adjacent the leading edge of said visor portion for securing said cover element in its closed position by fitting over the forward edge of a bag mounted on the bag holding and supporting device.

12. A closure for pivoting movement between open and closed positions on a device for holding and supporting a bag with the mouth of the bag opening upwardly, the bag holding and supporting device comprising two leg members of inverted U-shape connected by pivot members for pivoting movement relative to one another, said closure comprising:
   (a) a cover element having first and second side portions for extending downwardly beside the bag and below the mouth of the bag, a top portion connecting said side portions for extending over the mouth of the bag and an inwardly extending trailing edge means for cooperating with the leg members to prevent excessive rotation of the cover element in the closing direction; and
   (b) means located on said side portions below the mouth of the bag for rotatably mounting said cover element on the device for holding and supporting a bag so that the bag mouth is open in the open position of said cover element and is closed by said side portions and said top portion in the closed position of said cover element.

13. A closure for pivoting movement between open and closed positions on a device for holding and supporting a bag with the mouth of the bag opening upwardly, said closure comprising:
   (a) a cover element having first and second side portions for extending downwardly beside the bag and below the mouth of the bag, a top portion connecting said side portions for extending over the mouth of the bag and a visor portion on said cover element for projecting over the forward edge of a bag mounted on the bag holding and supporting device, said visor portion including a depression adjacent the leading edge thereof for securing said cover member in its open position by contacting the rear edge of a bag mounted in the bag holding and supporting device; and
   (b) means located on said side portions below the mouth of the bag for rotatably mounting said cover element on the device for holding and supporting a bag so that the bag mouth is open in the open position of said cover element and is closed by said side portions and said top portion in the closed position of said cover element.

* * * * *